US006502421B2

(12) United States Patent
Kotliar (10) Patent No.: US 6,502,421 B2
(45) Date of Patent: Jan. 7, 2003

(54) MOBILE FIREFIGHTING SYSTEMS WITH BREATHABLE HYPOXIC FIRE EXTINGUISHING COMPOSITIONS FOR HUMAN OCCUPIED ENVIRONMENTS

(76) Inventor: Igor K. Kotliar, 50 Lexington Ave. #249, New York, NY (US) 10010

( * ) Notice: Subject to any disclaimer, the term of this patent is extended or adjusted under 35 U.S.C. 154(b) by 0 days.

(21) Appl. No.: 09/975,215

(22) Filed: Oct. 10, 2001

(65) Prior Publication Data
US 2002/0083736 A1 Jul. 4, 2002

Related U.S. Application Data (63) Continuation-in-part of application No. 09/750,801, filed on Dec. 28, 2000, and a continuation-in-part of application No. 09/854,108, filed on May 11, 2001.

(51) Int. Cl.$^7$ ................................................. F25J 1/00
(52) U.S. Cl. .............................. 62/640; 62/78; 62/911; 169/46; 220/88.3
(58) Field of Search ........................... 62/78, 239, 640, 62/911; 169/44, 46; 220/88.1, 88.3

(56) References Cited

U.S. PATENT DOCUMENTS

| | | | | |
|---|---|---|---|---|
| 5,220,799 A | * | 6/1993 | Lievens et al. ............ | 220/88.3 |
| 5,799,495 A | * | 9/1998 | Gast, Jr. et al. ................ | 62/78 |
| 6,012,533 A | * | 1/2000 | Cramer ......................... | 169/45 |
| 6,112,822 A | * | 9/2000 | Robin et al. ................... | 169/46 |

* cited by examiner

Primary Examiner—Ronald Capossela
(74) Attorney, Agent, or Firm—Fire PASS Corp.

(57) ABSTRACT

Mobile fire-fighting systems and a method of producing breathable fire-suppression compositions are provided for extinguishing fires in buildings, and other human occupied structures, being also effective in suppressing fires under ruins of collapsed buildings. The systems employ a transportable high-pressure container having the breathable composition or nitrogen gas, or a liquid nitrogen container, vaporizer and a mixing chamber, wherein a vaporized nitrogen gas is mixed with an ambient air in order to produce said breathable fire-suppression composition. Refilling stations are provided for refilling the mobile systems with said composition, nitrogen gas or liquid nitrogen, all being generated at site from the ambient air. The method of producing said composition at a fire site employs mixing of nitrogen gas with ambient air or, alternatively, vaporizing of liquid nitrogen in necessary quantities and mixing it with ambient air in provided proportions. A method of delivery of the breathable fire-suppressive composition inside a building on fire is provided as well. The systems are also suitable for installation as a stationary fire-suppression system for a building or other structure. A breathable fire-suppression composition is provided for use in said mobile systems, said composition having an oxygen content below 16% or from 10% to 12% for the majority of civil applications.

25 Claims, 5 Drawing Sheets

MOBILE FIREFIGHTING SYSTEMS WITH BREATHABLE HYPOXIC FIRE EXTINGUISHING COMPOSITIONS FOR HUMAN OCCUPIED ENVIRONMENTS

This application is a continuation in part of U.S. application Ser. No. 09/750801 "Hypoxic Fire Prevention and Fire Suppression Systems and Breathable Fire Extinguishing Compositions for Human Occupied Environments" filed Dec. 28, 2000 and U.S. application Ser. No. 09/854108 "Hypoxic Fire Prevention and Fire Suppression Systems with Breathable Fire Extinguishing Compositions for Human Occupied Environments" filed May 1, 2001.

FIELD OF THE INVENTION

The present invention introduces the method, equipment, and composition for fighting fires in human-occupied spaces, using a mobile system that can produce, store and deliver hypoxic fire-extinguishing agent into any enclosed environment in order to instantly extinguish an ongoing fire and to prevent fire from starting again.

The goal of this invention is to provide superior solution for current firefighting vehicles that use water or foam for fighting fires.

With its mode of action based on the delivery and release of breathable hypoxic fire-suppressive gas mixture, this human-friendly system is completely non-toxic and entirely self-sustaining. Consequently, it is ideally suited for fighting fires in buildings of any type and all other applications where current firefighting vehicles are used. This invention is an important addition and improvement of the Fire Prevention and Suppression System (FirePASS™) described in earlier patent applications provided above.

DESCRIPTION OF PRIOR ART

Residential and industrial fires happen every minute and firefighters around the globe risk their lives while trying to extinguish them mostly with the oldest and primitive method of spraying water.

Modern firefighting vehicles can provide either water or foam, which is not efficient and creates damage to equipment and property. This inefficiency was demonstrated recently by the daylong efforts of extinguishing fire in Pentagon building after terrorist attack on Sep. 11, 2001.

Water or foam are especially inefficient in fighting fires under collapsed buildings, which usually happens after earthquakes and explosions. Hundreds of firefighters tried for over three weeks to extinguish multiple fires under World Trade Center in New York, collapsed after terrorist attack on the same date. And there is always a risk that survivors under rubble could drown in water supplied by fire engines. Many fires there were started and maintained by multiple gas leakages under ruins, which cannot be extinguished using current methods.

The invented Mobile Firefighting Unit (MFU) can extinguish similar fires within minutes by flooding ruins with breathable hypoxic agent that would instantly suppress local fires while allowing survivors to breath.

MFU can be used in any type of building and structure, providing instant fire suppression and, most importantly, safe human-breathable environment (clinical studies have proven that long term exposure to a hypoxic environment has significant health benefits).

Hypoxic breathable gas mixture (fire suppressive agent) can be inexpensively produced in necessary quantities through the extraction of oxygen from ambient air, which is provided by the Hypoxic Generator described in previous applications. Hypoxic fire-extinguishing agent is stored in a high-pressure container and can be released when needed at any location. Alternatively, breathable hypoxic agent can be produced at site by mixing ambient air with nitrogen, delivered in a liquid form in a mobile container and evaporated in necessary quantities through forced heating.

SUMMARY OF THE INVENTION

The principal objects of this invention are as follows:

A method for producing, storing, transporting and releasing breathable hypoxic fire-extinguishing agent inside human-occupied environments.

The provision of equipment that can produce, store, transport and release said hypoxic breathable fire-extinguishing agent at demand. Such equipment employs the processes of molecular-sieve adsorption, membrane-separation, cryogenic distillation and other oxygen extraction technologies for producing said agent.

The provision of mobile equipment that employs a high-pressure gas storage container in order to store said agent and a motorized frame or truck to transport it. The release of said agent on fire site is accomplished via hose, piping or tubing delivering said agent from the high-pressure container to the location of fire.

The provision of mobile equipment and a method to instantly produce said agent at fire site by evaporating liquid nitrogen and mixing nitrogen gas with ambient air. This equipment employs a liquid nitrogen storage container, vaporizer, air supply pump and mixing chamber, all being installed on a motorized frame or truck in order to transport it. The release of said agent on fire site is accomplished via hose, piping or tubing delivering produced agent from the mixing chamber to the location of fire.

The provision of mobile equipment and a method to instantly produce said agent at fire site by mixing nitrogen gas with ambient air in specific proportions. This equipment employs a high-pressure nitrogen gas storage container, air supply pump and a mixing chamber, all being installed on a motorized frame or truck in order to transport it. The release of said agent on fire site is accomplished via hose, piping or tubing delivering produced agent from the mixing chamber to the location of fire.

The provision of mobile equipment and a method to instantly produce a fire-suppressive, oxygen-depleted atmosphere, where people can safely breath (without respiratory-support means). This can be accomplished by the releasing the hypoxic agent inside a building or other object on fire and creating fire-suppressive atmosphere having an oxygen content ranging from 10% to 16%.

DESCRIPTION OF THE INVENTION

This invention is based on the discovery of the Phenomenon of Ignition Suppression and Combustion Elimination in hypoxic breathable air and the Hypoxic Fire Prevention and Suppression System (FirePASS™), being described in previous patent applications provided above.

Figure 1:
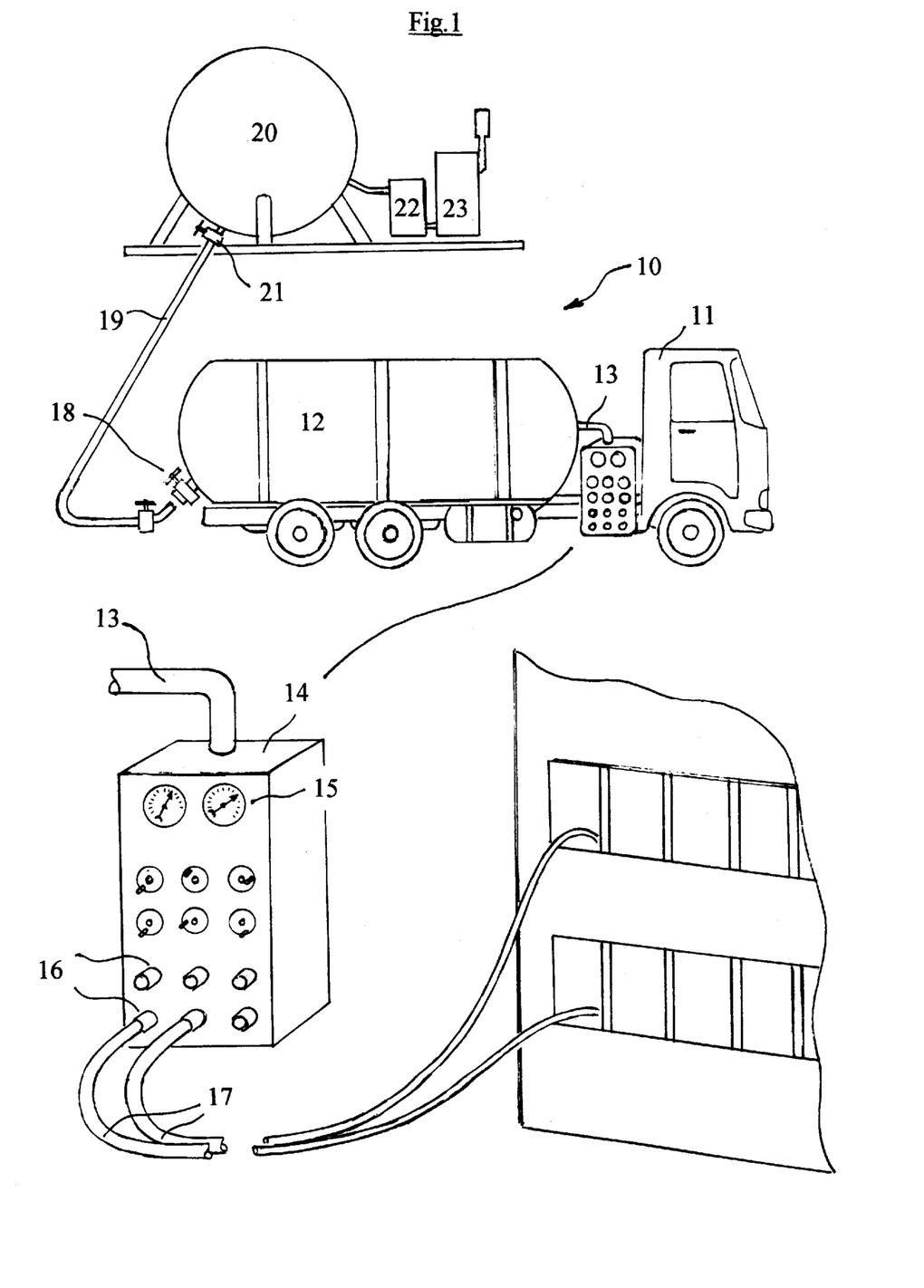
FIG. 1 presents an illustrative view of the MFU having a high-pressure container with hypoxic agent (MFU-HP).

FIG. 1 presents an illustrative view of the first preferred embodiment 10 of the Mobile Firefighting Unit for extinguishing fires in general applications, including private homes, high-rise apartment and office buildings, industrial facilities, etc. This system utilizes High-Pressure Hypoxic Agent and will be referred further as MFU-HP.

MFU-HP is assembled on the base of a standard truck 11 with a loading capacity of approximately 20 tons. A high-pressure container 12 holds 20 m3 of the Breathable Hypoxic fire-extinguishing Agent (BHA) compressed up a pressure of 400–500 bar. BHA is produced from ambient air using oxygen extraction (as described in previous patent applications) and generally contains 10%–12% of oxygen. The oxygen content may vary in some special application from 1%–10% (e.g. in oilfield and forest fires) up to 16% (long-term support of trapped survivors where danger of a secondary fire or explosion persists).

Container 12 is connected via high-pressure conduit 13 to distributor 14 that contains a pressure reducing system (shown on FIG. 2), control instruments panel 15 and a distribution manifold having multiple distribution outlets 16. Gas delivery hoses 17 can be attached, via high-pressure "quick-connect" connectors, to the outlets 16, which will allow delivering reduced-pressure BHA into a building or other object on fire.

Container 12 is equipped with a refilling inlet 18, through which it can be quickly refilled from a larger gas storage container 20 at the station or from a mobile refilling station. Refilling procedure is very simple: a secure high-pressure connector 19 is attached to container 12 and release valve 21 is opened. After a gas pressure in both containers is equalized, valve 21 can be closed and connector 19 can be disconnected from inlet 18 having a secure one-way valve that opens only when higher pressure from outside is applied. An additional compressor may be employed here in order to increase the refilling pressure.

Storage container 20 is constantly kept under 500 bar pressure and refilled by compressor 22 and hypoxic generator 23, available from FirePASS Inc. All three components, container 20, compressor 22 and hypoxic generator 23 can be assembled on a firefighters station or on a mobile platform. Such a mobile platform holds up to 80 cubic meters of the compressed BHA and can be connected to one or more MFU at a fire site in order to provide larger quantities of BHA in case of an extremely large fire.

One MFU-HP can provide 10,000 cubic meters of BHA, which is sufficient to flood a 10-story building with 20×20 meters wide floors. The mobile gas storage platform can deliver 40,000 cubic meters of BHA calculated at standard atmospheric pressure.

Figure 2:
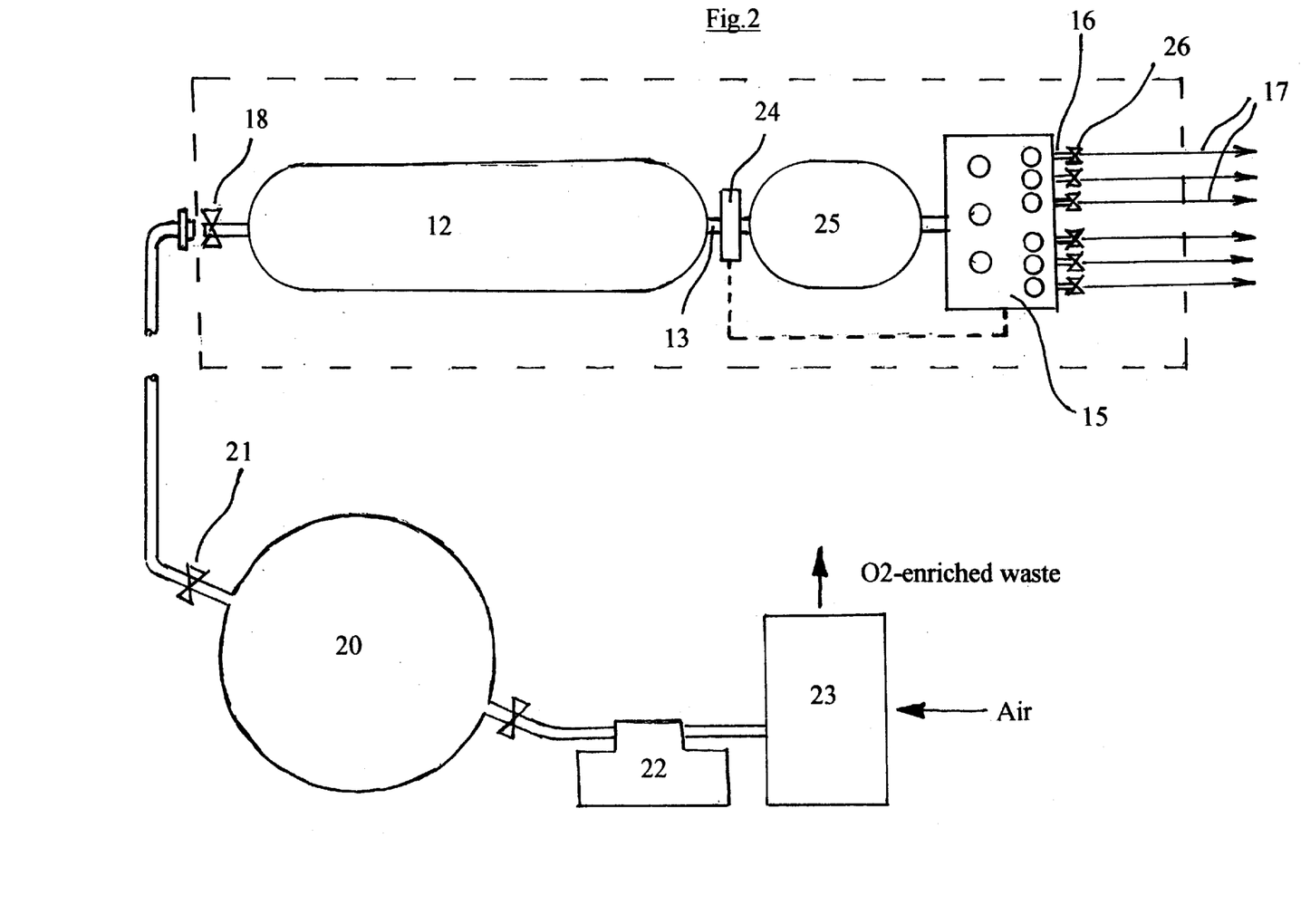
FIG. 2 illustrates schematically a working principle of the MFU-HP system.

FIG. 2 illustrates schematically the working principle of the MFU-HP system. When in use, the pressure-reducing release valve or reductor 24 opens by a signal from control unit 14 and the system provides compressed BHA into gas tank 25 where it is kept under reduced pressure controlled by pressure transducers and gauges 15. When a hose 17 is attached to an outlet 16, valve 26 automatically opens releasing BHA into hose 17 that delivers agent to the fire site. Reductor 24 is preset to automatically maintain pressure in the tank 25 at desired level of approximately 50 bar. When all outlets 16 are in operation and all valves 26 open, reductor 24 allows more flow into tank 25, in order to keep it at the preset pressure. When the system is shut down, reductor 24 automatically closes preserving the rest of the BHA in container 12.

The MFU-HP system is refilled when needed from a stationary gas storage container 20 at the firefighter's station or from a similar mobile unit. The BHA producing components 22 and 23, in smaller size, can be installed on the same MFU truck 11, which is not quite efficient, since in would take many hours to refill container 12. Therefore it was decided to make refilling station 20-22-23 separate from the MFU-HP.

Hypoxic generator 23 produces the breathable hypoxic agent. It consists of a compressor that intakes ambient atmospheric air and sends it in compressed form into air-separation module where a part of the oxygen is extracted. The oxygen-enriched gas mixture can be either disposed into the atmosphere or, preferably, sent to a fuel cell that can generate electricity for the station's needs.

BHA produced by Hypoxic generator 23 is further compressed by compressor 22 up to 500 bar and sent for storage into gas storage container 20.

Oxygen-extraction technology is well known to those skilled in the art and may employ oxygen-enrichment membranes and pressure-, vacuum- or temperature-swing adsorption or other appropriate processes. Suitable hypoxic generators and/or air-separation modules are available from Hypoxico Inc. and FirePASS Inc. in New York.

The product remaining after oxygen extraction is an oxygen-depleted (hypoxic) gas mixture or BHA, containing less than 16% of oxygen, more than 84% of nitrogen and traces of other (mostly noble) atmospheric gases and water vapor. For the majority of civil applications the oxygen content in the product should be in the range from 10% to 14% and nitrogen content between 90% and 86%. This product is actually the Breathable Hypoxic Fire Extinguishing Composition described in the previous patent applications provided above.

The Breathable Hypoxic Fire Extinguishing Composition can be also produced at the refilling station by simply mixing nitrogen gas with ambient air at necessary proportions. For instance, mixing equal parts of nitrogen gas and air can make a composition with 10.5% oxygen content. This technology is similar to the system described further according to FIG. 5 and 6.

Figure 3:
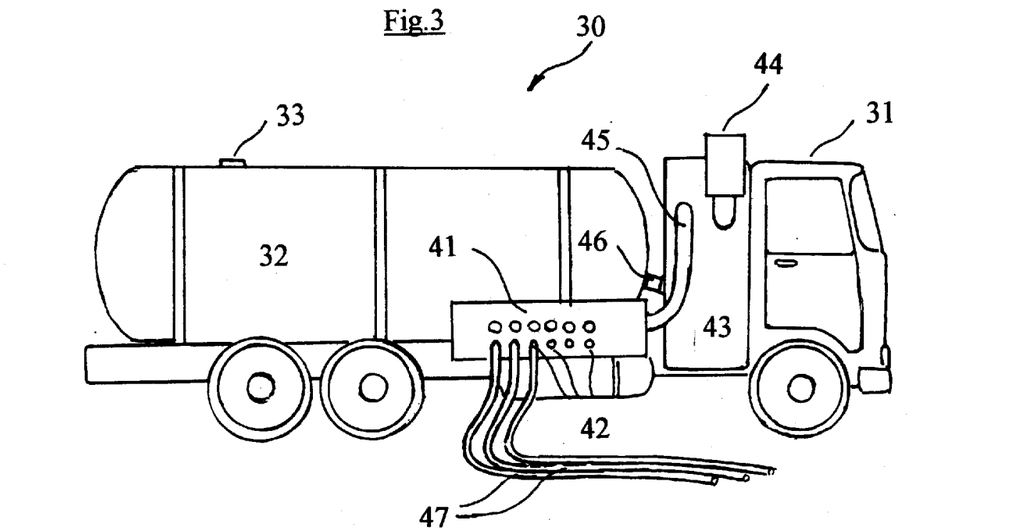
FIG. 3 presents an illustrative view of the MFU having liquid nitrogen container, vaporizer and mixing chamber for producing hypoxic agent (MFU-L).
Figure 4:
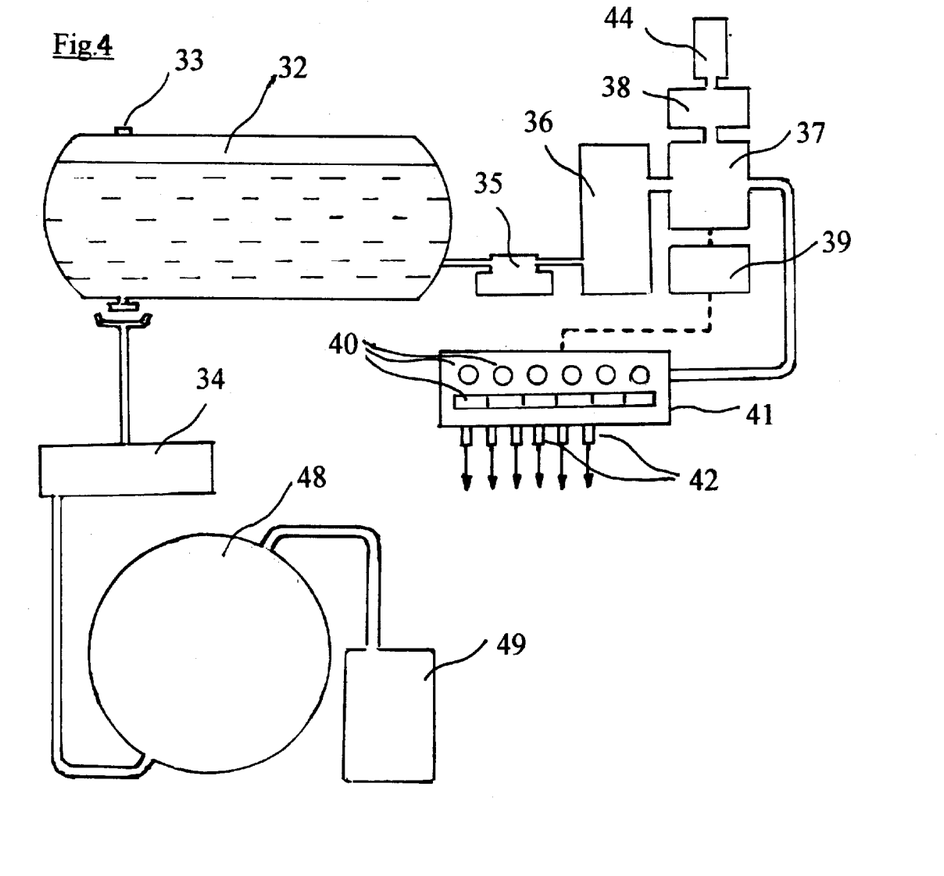
FIG. 4 shows schematically a working principle of the MFU-L system.

FIG. 3 and FIG. 4 present an illustrative view and a working principle of the second preferred embodiment 30 of the invented system—MFU-L having liquid nitrogen container 32 mounted on the chassis of the truck 31. Container 32 is build as a dewar-type vessel with a refilling inlet 33 and can hold up to 20 cubic meters of liquid nitrogen that is constantly kept under its boiling point temperature of −195.8° C. by an optional cryogenic cooler 34 in order to prevent evaporation of nitrogen or simply by adding more liquid nitrogen at a much lower temperature. MFU-L must be always fully refilled with liquid nitrogen. In some applications, small quantities of liquid nitrogen can constantly circulate through cryogenic cooler 34 and back into container 32. Cryogenic coolers of different types are available from a number of manufacturers. Stirling-type gas power and liquid power coolers or turboexpander coolers are preferred. Cryogenic cooler 34 is preferably installed separately at the fire station since it is not needed during firefighting operation. Cryogenic cooler 34 can also refill container 32 with liquid nitrogen in cases where a larger cryogenic nitrogen plant is not available. However, it is highly recommended to have such liquid nitrogen plant 49 with a larger storage container 48 (e.g. 500 m3) that can provide for quick refilling of all MFU-L at the station or in a particular urban area. At the fire station, the MFU-L can be directly coupled with the refilling container 48 or straightly with the liquid nitrogen plant 49. This way, there is no need in cryogenic cooler 34 since the level of liquid nitrogen in container 32 will be maintained automatically by its refilling from container 48 or from plant 49. Suitable liquid nitrogen plants are available from a number of manufacturers and are offered by FirePASS Inc.

The working principle of the MFU-L can be described as follows. In order to generate BHA at the fire site, the pump 35 pumps liquid nitrogen from container 32 into evaporator 36, where it is transformed into nitrogen gas. Different types of liquid nitrogen evaporators are available on the market, from diesel-fired, non-fired to heat-recovery vaporizers. The most preferred type of an evaporator for this invention is a non-fired or a heat recovery system that utilizes the heat from the burning diesel fuel used by the MFU truck. This type of evaporator can produce 200 m3/min of nitrogen and will be available from FirePASS Inc. in New York. Heating systems employing microwave radiation or electric induction are also suitable for this application.

Nitrogen gas from evaporator 36 enters mixing chamber 37 where it is mixed with an ambient air supplied by a blower or compressor 38 having an air intake filter 44. If nitrogen and air are mixed in equal quantities, they will provide BHA with an oxygen content of 10.5%, which is acceptable for most applications. However, for residential fires, it is recommended to keep the oxygen content in BHA around 12%, which can be achieved by mixing 100 volumes of nitrogen with 116 volumes of air. Necessary mixing proportions can be easily preset and maintained manually or automatically by a computerized control system 39 that can adjust airflow and/or pressure from the air pump 38 according to the data provided by oxygen transducers 40 installed in the distribution unit 41 having gas outlets 42.

MFU-L components 35, 36, 37 and 38 are assembled in box 43 having outside air-intake filter 44, BHA outlet 45 and liquid nitrogen supply conduit 46. The components 39, 40 and 42 are assembled in the distribution unit 41 having additionally pressure gages, temperature transducers and other necessary instruments. Gas delivery hoses 47 are equipped with quick-disconnect fittings for instant connection with distribution outlets 42. On the other end hose 47 is equipped with a heat resistant ceramic or metal nozzle that can be inserted through a window or other opening into a building on fire. The MFU of both types should be equipped with a skylift-type elevating machine that can deliver and insert hose 47 into any floor of a high-rise building or structure.

The refilling station of the MFU-L components 48, 49 and optional component 34 are installed separately at a fire station. FirePASS Inc. offers suitable dewar-type liquid nitrogen storage containers and liquid nitrogen generating plants capable of producing 2, 5 and 7.5 ton per day. These plants are available in compact containers, both truck mounted and stationary types.

The MFU-L can carry 20 m3 of liquid nitrogen that will provide 18000 m3 of nitrogen gas and is capable of delivering 45,000 m3 of BHA at the site without refilling. This quantity of the BHA is sufficient to completely exchange atmosphere in a 50-story high-rise, removing smoke and other toxic gases and providing safe, breathable fire-suppressive environment. Gas delivery hoses inserted in the floors on fire would provide safe BHA that will extinguish any fire in minutes and without any damage to people, property or equipment.

Figure 5:
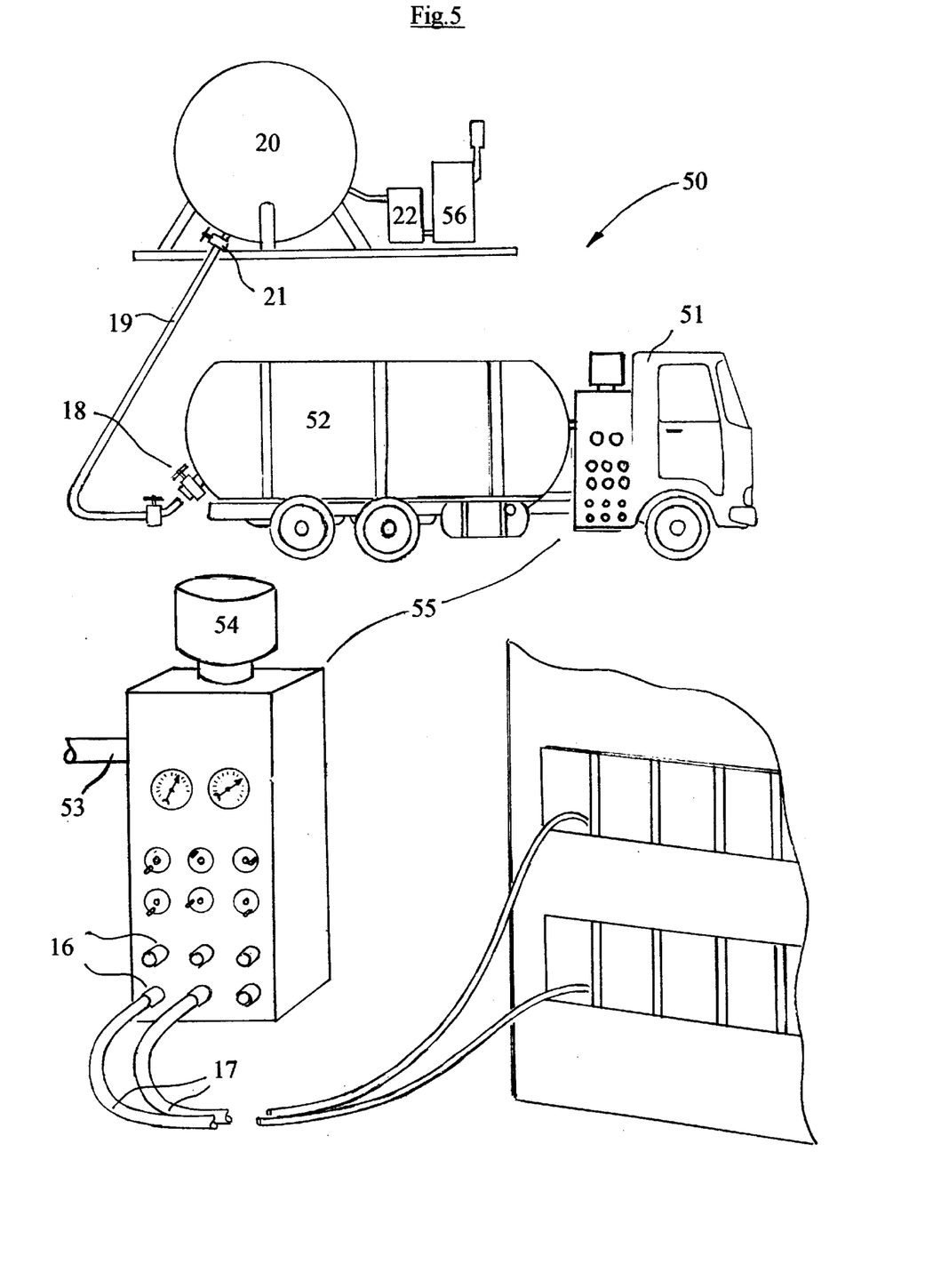
FIG. 5 presents an illustrative view of the MFU having a high-pressure container with hypoxic agent (MFU-HPN).
Figure 6:
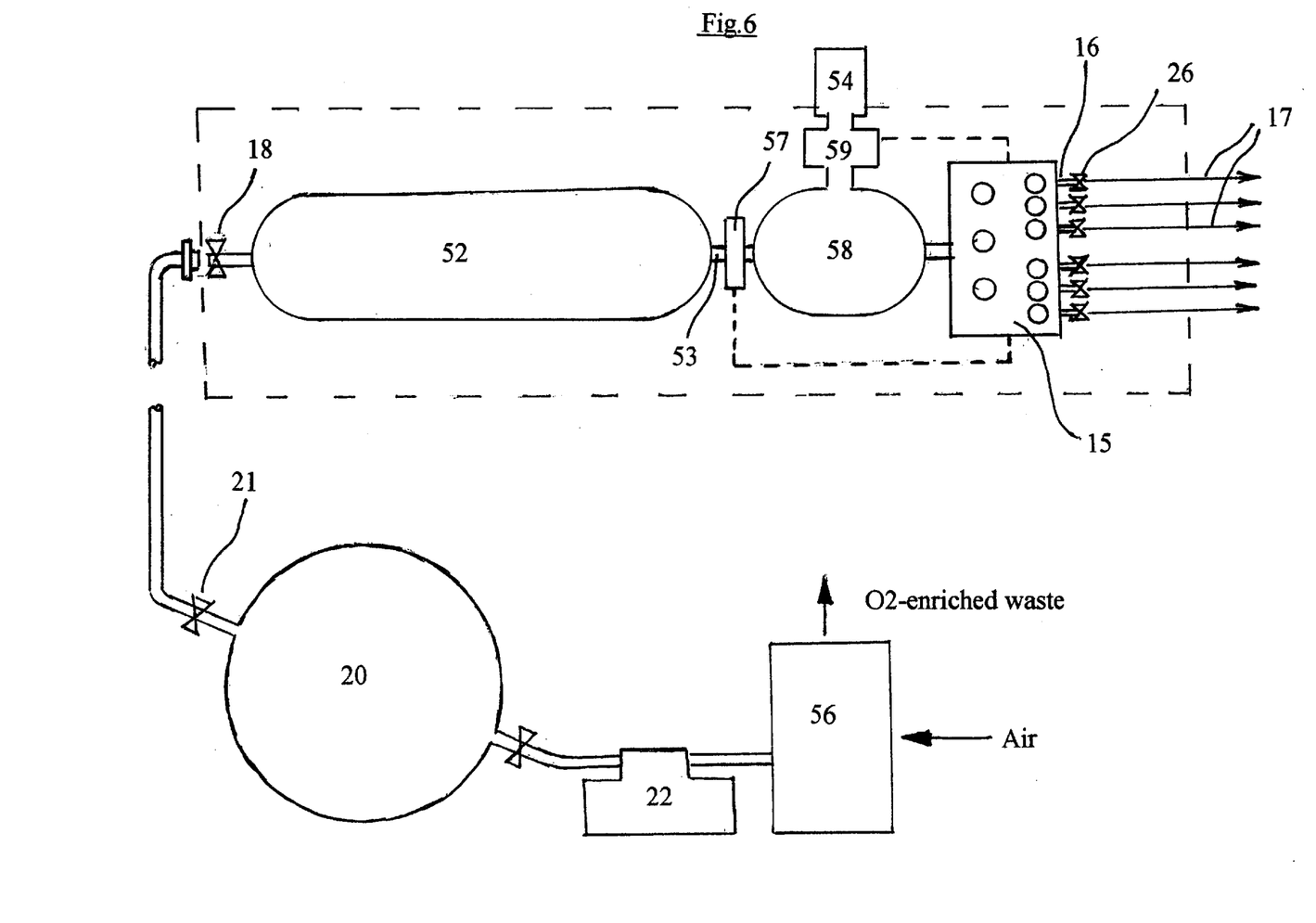
FIG. 6 illustrates schematically a working principle of the MFU-HPN system.

FIG. 5 shows third embodiment of the MFU, which is a system (MFU-HPN) that employs a high-pressure container, similar to MFU-HP, filled with a nitrogen gas instead of the BHA and utilizing the air-mixing feature of the MFU-L.

The MFU-HPN system 50 consists of a truck 51, a high-pressure nitrogen gas container 52 and a mixing-and-distribution unit 55. The working principle of this embodiment is presented on FIG. 6. The nitrogen gas, being held in container 52 under 500 bar pressure, is released, via outlet 53 and pressure reducing device or reductor 57, into mixing chamber 58. An air pump 59 draws ambient air through intake 54 and supplies it into mixing chamber 58 wherein the air and nitrogen gas mix in necessary proportions that can be regulated from control panel 15 installed on the front of the unit 55. Mixing of equal volumes of air and nitrogen would provide a breathable fire-suppressive composition having an oxygen content of 10.5%, which is suitable in most applications. Further said composition is distributed, via multiple gas outlets 16 and valves 26, into gas delivery hoses 17 that deliver it to the fire location.

The components 18, 19, 20, 21 and 22 of the refilling station are the same as shown on FIG. 1 and 2. However, the hypoxic generator 23 is replaced in this embodiment with a nitrogen generating plant 56 that can employ molecular sieve adsorption, membrane separation, cryogenic distillation and other air separation technologies in order to supply the refilling station with nitrogen. Nitrogen gas is compressed up to 500 bar by a multistage compressor 22 and is stored in a storage container 20 having release valve 21 for refilling of MFU.

The MFU-L system 30 and MFU-HPN system 50 (excluding transporting vehicles 31 or 51) can be also installed on the ground or a roof of a building and utilized as on-site fire-suppression system. Such stationary systems can be extremely effective in all kinds of buildings, tunnels, mines and other human-occupied facilities and enclosed environments. In this case multiple gas outlets 42 should be connected to stationary pipes 47 leading to different floors, levels or areas of a building or structure. This will allow delivering BHA directly to the location where fire or smoke was detected.

In order to improve effectiveness of the MFU, all residential and office buildings should have installed similar distribution piping leading to different floors, levels or areas of a building with clearly marked inlets accessible from the street. This will allow firefighters to connect MFU gas hoses to the pipes leading to the floors or levels affected by fire. BHA supplied directly to the right location would extinguish any fire within minutes while allowing people to breath. The installation of such piping does not require much expense, but would greatly improve building's fire safety, provided the MFU are deployed in the area.

What is claimed is:
1. A mobile firefighting system for providing a breathable hypoxic fire-extinguishing agent at a fire site, said system comprising:
   a motorized platform for transport of said system to a location of fire;

a storage container for storing and transportation of said agent or its main component, said container being assembled on said platform;

an agent preparation and release system having multiple gas outlets to which gas delivery hoses can be connected in order to deliver said agent directly to the location of fire;

said fire-extinguishing agent being nitrogen-enriched air having oxygen content below 16% and, when released, providing fire extinguishing atmosphere that allows people to breath;

said storage container having an inlet for refilling at a refilling station;

said refilling station being installed separately at a fire station or on a separate mobile platform.

2. The system according to claim 1, wherein said storage container being a high-pressure vessel holding said agent compressed up to 500 bar;

said preparation and release system comprising a pressure-reducing device, a reduced pressure container and a distribution manifold having said gas outlets;

said refilling station comprising an oxygen-extraction device processing ambient air and producing said agent, a compressor that compresses said agent to a pressure up to 500 bar and a high-pressure gas storage container where said agent being stored; said gas container having a refilling outlet for refilling said mobile system with the agent.

3. The system according to claim 1, wherein said storage container being a dewar-type vessel holding liquid nitrogen;

said preparation and release system comprising a cryogenic fluid pump that draws liquid nitrogen into a vaporizer where it transforms into a nitrogen gas, being further delivered into a mixing chamber for mixing with an ambient air supplied by an air pump, whereby said agent is produced and is further transmitted into a distributor having said gas outlets;

said refilling station comprising a cryogenic nitrogen plant and a liquid nitrogen storage vessel having an outlet for refilling said mobile system with liquid nitrogen; said cryogenic nitrogen plant producing liquid nitrogen from ambient air at site.

4. The system according to claim 1, wherein said storage container being a high-pressure vessel holding nitrogen gas compressed up to 500 bar;

said preparation and release system comprising a pressure-reducing device, a mixing chamber, an air supply device and a distribution manifold having said gas outlets;

said refilling station comprising an oxygen-extraction device processing ambient air and producing nitrogen gas, a compressor that compresses said nitrogen gas to a pressure up to 500 bar and a high-pressure gas storage container where said nitrogen being stored; said gas container having a refilling outlet for refilling said mobile system with the nitrogen gas.

5. The system according to claim 1 and said breathable fire-extinguishing agent having an oxygen content of 10%–12% for a majority of civil applications in human-occupied environments.

6. The system according to claim 1 and said gas delivery hoses connected to a distribution piping in a building or structure; said piping leading to different floors, levels or areas of the building or structure and having clearly marked inlets accessible from the street, which allows firefighters to connect said gas hoses to the pipes leading to different floors, areas or levels affected by fire;

said breathable hypoxic fire-extinguishing agent being supplied through selected piping directly to the location of fire.

7. The system according to claim 1, wherein the functional equipment of said system being installed as a stationary fire-suppression system in a building, transportation tunnel, mine and other human-occupied structure.

8. A mobile firefighting system for providing a breathable fire-extinguishing composition at a fire site, said system comprising:

a high-pressure gas vessel containing said composition under a pressure of over 100 bar, said vessel having a refilling inlet with a one-way valve and an outlet;

said outlet communicating with a pressure-reducing device and transmitting said composition into a reduced-pressure container;

said reduced-pressure container communicating with a distribution unit having multiple gas outlets that communicate with gas delivery hoses and transmit said composition to the location of fire;

a motorized chassis for carrying said vessel and equipment of said system and delivering it to fire site;

a refilling station installed separately at a fire station or on a mobile platform; said refilling station generating said composition from an ambient air and storing said composition in a high-pressure storage container;

said composition being breathable oxygen-depleted air having oxygen content below 16%.

9. The system according to claim 8 and said composition having oxygen content in the range from 10% to 14%.

10. The system according to claim 8, wherein said refilling station utilizing an oxygen extraction device for producing said composition by reducing oxygen content in the ambient air; said device utilizing molecular sieve adsorber, membrane separator or cryogenic separator.

11. The system according to claim 8, wherein said refilling station utilizing a process of mixing nitrogen gas with ambient air in order to produce said breathable fire-extinguishing composition.

12. A mobile firefighting unit for providing a breathable hypoxic fire-extinguishing agent at a fire site, said unit comprising:

a transportable liquid nitrogen container having a refilling inlet and liquid nitrogen outlet; said container filled with liquid nitrogen when said mobile unit at service;

said liquid nitrogen outlet communicating with a vaporizer and, when in use, transmitting liquid nitrogen into it for vaporization;

a mixing chamber communicating with said vaporizer and receiving nitrogen gas from it for mixing with ambient air supplied by an air pump communicating with said chamber;

said breathable agent being prepared in said mixing chamber by adding ambient air to said nitrogen gas; said agent having oxygen content below 16%;

a distribution device communicating with said mixing chamber and receiving said agent from it for distribution through multiple gas outlets;

multiple gas delivery hoses connected to said gas outlets and delivering said agent to location of fire;

said distribution unit having transducers for measuring pressure and oxygen content in said agent and allowing to regulate these parameters manually or automatically;

a truck or trailer platform for transporting equipment of said mobile unit to a fire site;

a refilling station installed separately on the ground or a mobile platform and having a liquid nitrogen production plant and a storage container designed for quick refilling of said mobile unit with liquid nitrogen.

13. The mobile unit according to claim 12, wherein said transportable container being a dewar-type vessel filled with liquid nitrogen that, when in use, is drawn by a cryogenic liquid pump into said vaporizer where liquid nitrogen is heated and vaporized;

said vaporizer having a heater powered by microwave radiation or electrical induction or a heat exchanger that utilizes heat from a diesel or other fuel combustion device.

14. The mobile unit according to claim 12, wherein said refilling station having a cryogenic cooling device for maintaining the temperature of the liquid nitrogen in said transportable container below its boiling point and for supplying additional liquid nitrogen in order to maintain said container fully refilled at any time.

15. The mobile unit according to claim 12, wherein said agent having oxygen content from 10% to 12% for civil applications in human-occupied environments and from 0.1% to 10% for industrial fire hazards in non-occupied areas.

16. The mobile unit according to claim 12 having all equipment, excluding transporting vehicle, installed as a stationary fire-suppression system for a building, tunnel, mine and other human-occupied facilities and environments.

17. A mobile firefighting system for providing a breathable fire-extinguishing agent at a fire site, said system comprising:

a high-pressure gas container containing a nitrogen gas under a pressure of over 100 bar, said container having a refilling inlet with a one-way valve and an outlet;

said outlet communicating with a pressure-reducing device and transmitting said nitrogen gas into a mixing chamber;

said mixing chamber communicating with an air supply device and receiving an ambient air from said device for mixing with said nitrogen in order to produce said fire-extinguishing agent;

said mixing chamber communicating with a distribution unit having multiple gas outlets that communicate with gas delivery hoses and transmit said agent to the location of fire;

a motorized chassis for carrying said container and equipment of said system and delivering it to fire site;

a refilling station installed separately at a fire station or on a mobile platform; said refilling station generating said nitrogen gas from the ambient air and storing said gas in a high-pressure storage vessel;

said breathable agent being a mixture of nitrogen and ambient air having an oxygen content below 16%.

18. The system according to claim 17, wherein said refilling station utilizing an oxygen extraction device for producing said nitrogen gas from ambient air; said device utilizing molecular sieve adsorber, membrane separator or cryogenic separator.

19. The fire fighting system according to claim 17, wherein said system being installed as a stationary fire-suppression system in a building, transportation tunnel, mine and other human-occupied structure.

20. A method of producing a breathable fire-extinguishing composition, said method comprising:

generating of a necessary quantity of liquid nitrogen being stored in a dewar-type container;

transmitting said liquid nitrogen into a vaporizer;

vaporization of said liquid nitrogen being transformed into a nitrogen gas;

transmitting of the nitrogen gas into a mixing chamber wherein said gas being mixed with a corresponding amount of an ambient air delivered by an air pumping device and producing a breathable gas mixture having fire suppressive properties;

said gas mixture being delivered from said mixing chamber into a distribution and control unit equipped with oxygen and pressure monitoring devices that allow to control an oxygen content and a pressure in said gas mixture;

said gas mixture being supplied from said distribution unit into multiple gas delivery hoses for delivery of said breathable gas mixture to the location of fire in order to suppress combustion and providing fresh human-breathable atmosphere;

said breathable gas mixture having an oxygen content below 16%.

21. The method according to claim 20, wherein said generating of liquid nitrogen employs a cryogenic liquefier in order to liquefy nitrogen gas produced from ambient air using an oxygen-extraction device;

said oxygen-extraction device being selected from the group consisting of a membrane air separator, pressure-swing adsorber, temperature-swing adsorber, reversing heat exchanger and other oxygen extraction equipment.

22. The method according to claim 20, wherein said generating of liquid nitrogen employs a cryogenic liquefier in order to liquefy ambient air;

said liquid nitrogen being extracted from said liquefied air in a cryogenic distillation device or in a centrifuge.

23. The method according to claim 20, and said vaporizer being a device using heat from a combustion engine, atmospheric air, microwave radiation, electrical induction, burning fuel, water and other available heat sources.

24. The method according to claim 20 and said breathable gas mixture having an oxygen content in a range from 14% to 16% for use as a constant fire-preventative atmosphere in human-occupied environments, from 8% to 14% for use as a fire suppressant in human-occupied environments and from 0.1% to 8% in non-occupied environments.

25. The method according to claim 20, being applied to a stationary fire-suppression system in a building, transportation tunnel, mine and other human-occupied structure.

* * * * *